March 22, 1960 W. STAEGE 2,929,369
METHOD OF AND DEVICE FOR CONTROLLING THE IDLING
OPERATION OF SPARK IGNITION LIQUID FUEL
INJECTION INTERNAL COMBUSTION ENGINES
Filed Oct. 16, 1957 7 Sheets-Sheet 3

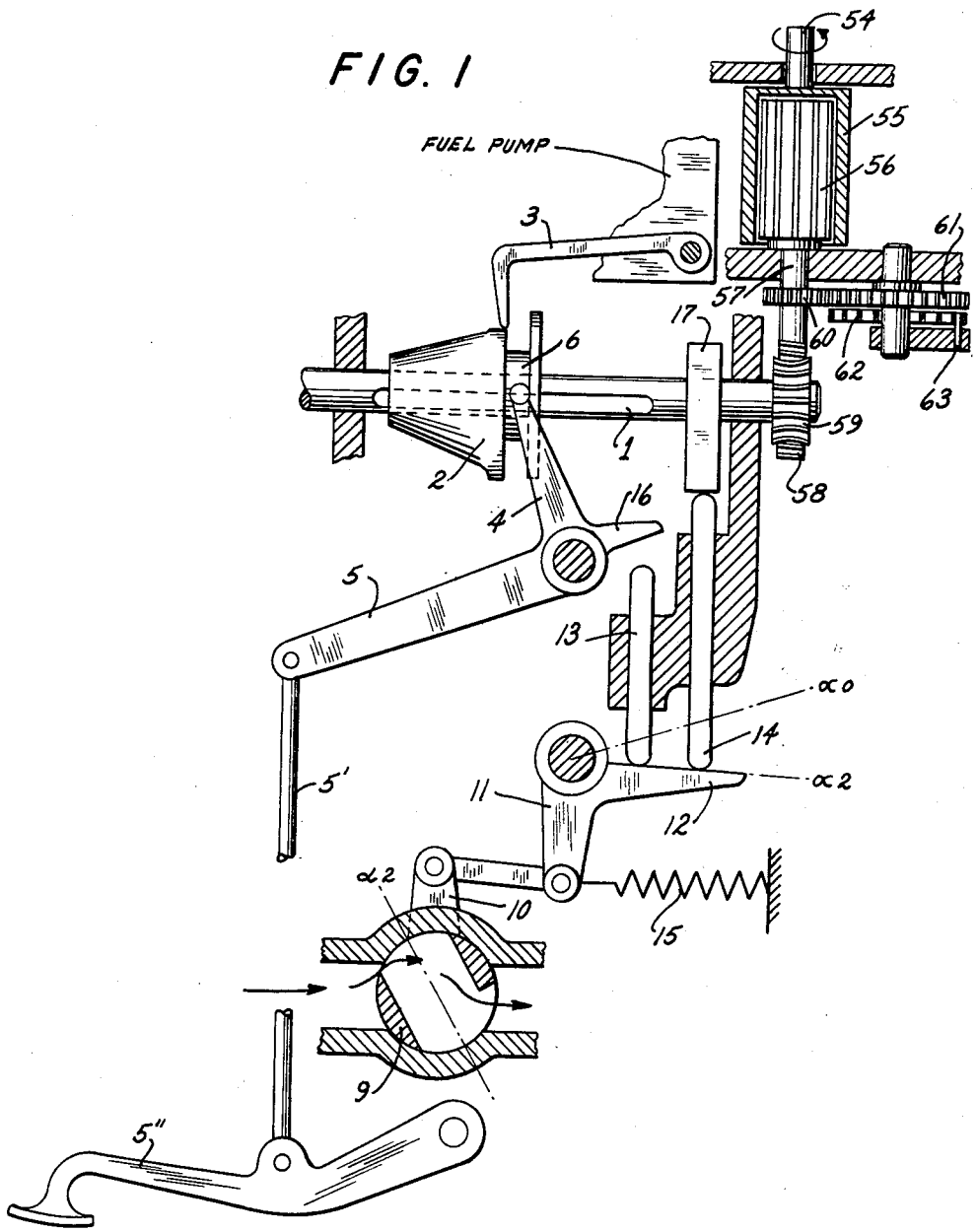

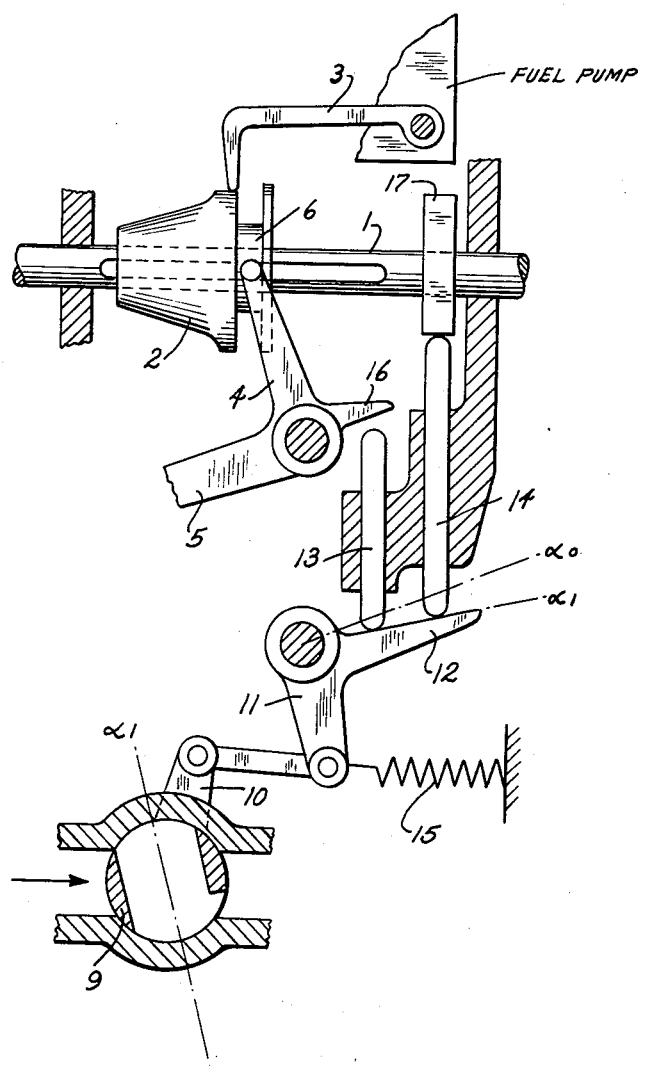

INVENTOR:
Werner Staege
by Michael S. Striker
Attorney

March 22, 1960 W. STAEGE 2,929,369
METHOD OF AND DEVICE FOR CONTROLLING THE IDLING
OPERATION OF SPARK IGNITION LIQUID FUEL
INJECTION INTERNAL COMBUSTION ENGINES
Filed Oct. 16, 1957 7 Sheets-Sheet 4
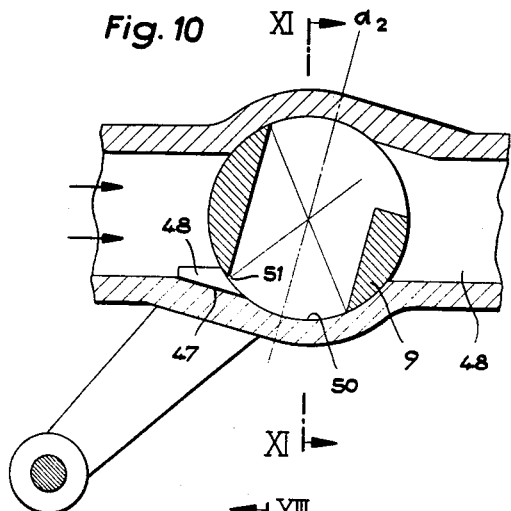
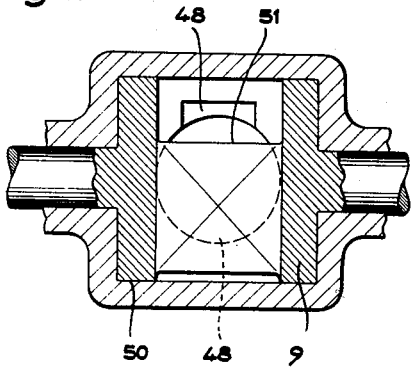
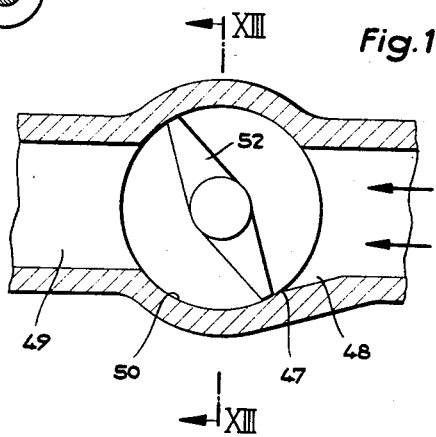
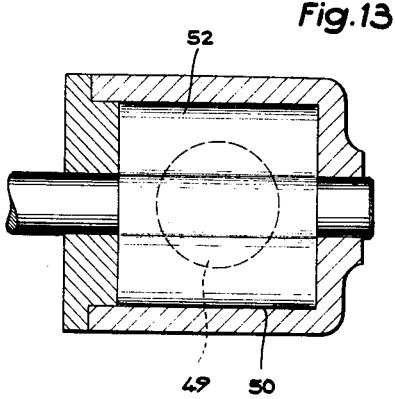
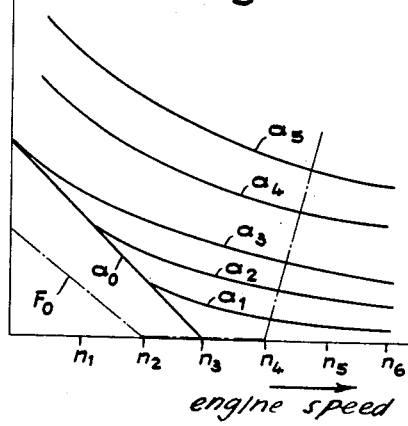
INVENTOR:
Werner Staege
by Michael S. Striker
Attorney March 22, 1960  W. STAEGE  2,929,369
METHOD OF AND DEVICE FOR CONTROLLING THE IDLING
OPERATION OF SPARK IGNITION LIQUID FUEL
INJECTION INTERNAL COMBUSTION ENGINES
Filed Oct. 16, 1957  7 Sheets-Sheet 5

INVENTOR:
Werner Staege
by Michael S. Striker
Attorney

March 22, 1960 W. STAEGE 2,929,369
METHOD OF AND DEVICE FOR CONTROLLING THE IDLING
OPERATION OF SPARK IGNITION LIQUID FUEL
INJECTION INTERNAL COMBUSTION ENGINES
Filed Oct. 16, 1957 7 Sheets-Sheet 7

INVENTOR:
Werner Staege
by Michael S. Striker
Attorney

United States Patent Office 2,929,369
Patented Mar. 22, 1960

2,929,369

METHOD OF AND DEVICE FOR CONTROLLING THE IDLING OPERATION OF SPARK IGNITION LIQUID FUEL INJECTION INTERNAL COMBUSTION ENGINES

Werner Staege, Freudenstadt, Germany, assignor to Kugelfischer Georg Schaefer & Co., Schweinfurt, Germany, a firm Application October 16, 1957, Serial No. 690,573

18 Claims. (Cl. 123—139)

The present invention relates to a method of and a device for controlling the idling operation of spark ignition internal combustion engines using solid fuel injection.

It has been known in the case of spark ignition liquid fuel injection internal combustion engines to have the rate of fuel injection, i.e. the quantity of fuel injected into a given cylinder per working stroke, controlled, among other factors, by the rotational speed of the engine and by the position of the throttling member controlling the intake of the engine. This makes it possible, under conditions under which the engine crankshaft is driven by the road wheels, as is the case on downgrades, for example, with the engine control in its idling position, to have the rate of delivery of the fuel injection pump controlled as a function of engine speed in such a manner as to reduce the fuel delivery to zero up to a point at which a certain engine speed is reached which is still higher than the minimum engine speed required for smooth idling. However, this economic advantage is accompanied by a disadvantage which is to be seen in the fact that, if it is intended to operate the engine with liquid fuel injection immediately following the aforesaid condition of operation, there will occur a transition period during which the fuel/air mixture is too lean, an ignitable mixture not being obtained until after this transition period has elapsed. This condition results in misfiring and jerky operation of the engine and in the development of engine knock. The fact that the fuel/air mixture is too lean in the said transition range results from the fact that, that with the rate of fuel injection being reduced as a function of engine speed, the rate of air admission required for idling, which rate is determined by a stop limiting the opening of the throttling member, is maintained, so that, when the rate of fuel injection is being increased from zero, a considerable amount of air is already being admitted to the engine, this rate of air admission being even considerably increased by the throttling member being opened still further. This condition is even aggravated by the fact that the rate of air admission increases more rapidly than the rate of fuel injection.

The present invention eliminates this drawback by providing for the cross-sectional area of the idling air intake passage to be reduced, as a function of engine speed, to a minimum value or, if necessary, to zero, while the engine is being accelerated with the engine control in its idling position until that engine speed is reached at which the fuel delivery of the injection pump is interrupted. Thus, the rate of fuel injection is increased from zero with the intake throttling member first being closed or substantially closed. As a result, the discrepancy observed heretofore between the rate of fuel injection and the rate of air induction within the said transition range is eliminated.

Preferably, a control characteristic of such a pattern is provided that, with increasing engine speed, first the cross-sectional area of the idling air admission passage and at a later time, after the engine speed has risen slightly, the rate of fuel injection is controlled in such a manner that the minimum value and, if necessary, the value zero, is obtained. Thus, when fuel injection is being resumed, the injection pump will already start delivering fuel while the induction air throttling member has either uncovered its minimum cross-section or is completely closed. As a result, it is impossible that the increase in fuel delivery is delayed in relation to the increase in the rate of air admission. It is convenient to match the idling air admission cross-section and the rate of fuel injection in such a manner in relation to one another that within the entire transition range the ratio of fuel to air in the mixture is greater than stoichiometrically necessary so as to ensure that a rich mixture is available which is ignitable under all conditions. Upon the cross-sectional area of the admission duct having reached its minimum value or having been reduced to zero, with the engine being driven by the road wheels of the vehicle, the engine can no longer produce any additional braking effort as the amount of work expended in compressing air is too small. Where it is intended to derive an additional braking action from the engine as is particularly desirable on downgrades, i.e. when it is desired to conserve the brakes, it will be necessary again to increase the cross-section of the admission duct, while the delivery of fuel remains interrupted. This requirement is fulfilled by the method of the present invention, because this method provides for the cross-section of the intake air throttle to be again increased for the purpose of increasing the amount of air admitted to the engine so as to permit the latter to product a greater braking effort, this being done while the speed of the engine is being increased beyond that speed at which the said cross-section had been reduced to a predetermined minimum.

The invention may be carried into practice in various ways, and several specific embodiments thereof will now be described by way of example with reference to the accompanying drawings, in which:

Fig. 1 is a diagrammatic showing of a control device according to the invention in its idling position in which the induction air throttle has been adjusted to allow the passage of the air flow required for the idling operation of the engine;

Fig. 2 is similar to Fig. 1, but shows the device of the invention in a position in which the air throttle has completely closed the air admission passage;

Figure 4:
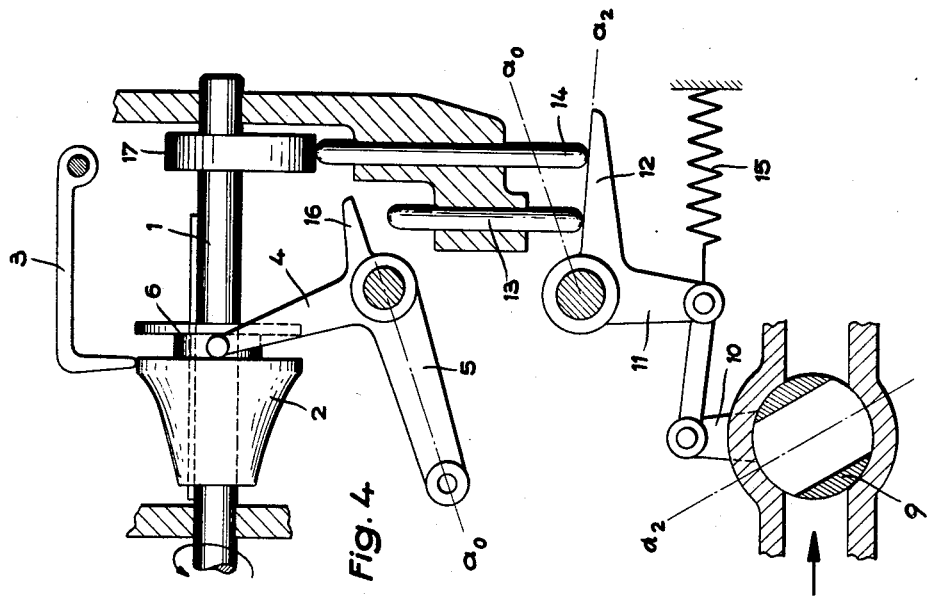
Figure 14:
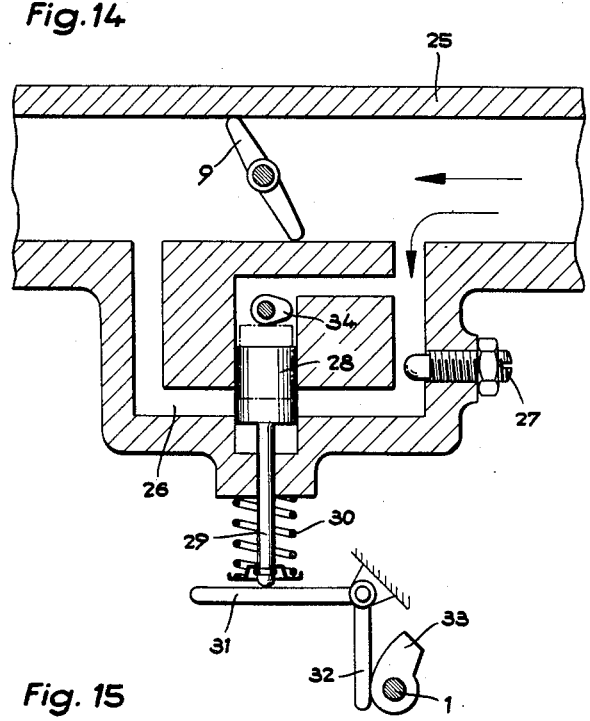
Figure 15:
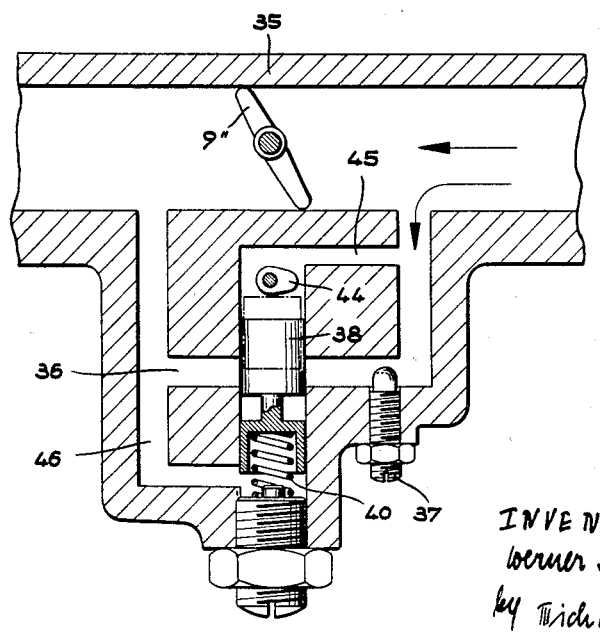

Fig. 4 shows the control device of the invention with the accelerator lever still in its idling position, but with the engine running at a still higher speed at which, while the zero position of the member controlling the rate of fuel delivery is being maintained, the air throttle has again been opened for the purpose of admitting to the engine the amount of air required to permit the engine to produce a greater braking effort;

Fig. 5 is a graphic representation of the relationship between the rate of fuel delivery $q$ and the engine speed $n$ for different positions of the air throttle or the accelerator lever, respectively, and of the relationship between the cross-sectional area $F_0$ of the air throttle under idling conditions and the engine speed $n$;

Figs. 6 to 9 inclusive illustrate another embodiment of the control device of the invention, the various positions of the air throttle member corresponding to the positions shown, in the same order, in Figs. 1 to 4 inclusive;

Figs. 10 to 13 inclusive show two different embodiments of throttle elements the novel design of which is of particular advantage within the scope of the present invention; and Figs. 14 and 15 respectively show two further embodiments of control devices according to the invention.

Referring now more particularly to the drawings, it will be seen in Figs. 1 to 4 showing a device serving to control the rate of fuel injection as a function of engine speed and of the position of the air throttle that a control cam 2 is mounted for axial sliding movement on a governor shaft 1. The rotary motion is imparted to the governor shaft 1 by a torque which depends on the speed of the engine and which is applied to the governor shaft in opposition to the action of a suitable energy storing device.

For this purpose, the engine to be controlled is arranged in a manner, known per se, and as for instance shown in the U.S. Patent No. 2,858,822 to drive a short circuited rotor 55 by means of a shaft 54. Thus, the short circuited rotor 55 will rotate at the same speed as the engine, or, if a gearing is arranged between the rotor and engine shaft, there will be a constant ratio between the rotor speed and the engine speed. The rotor 55 influences a permanently magnetic armature 56 mounted on a shaft 57. Thus, the higher speed of the short circuited rotor 55, the higher will be the torque which the rotor can transmit to the permanent magnet and hence to the shaft 57. The shaft 57 of the permanent magnet 56 carries a pinion 60 which is in mesh with a gear wheel 61. One end of the shaft carrying gear wheel 61 is engaged by a spiral spring 62, the other end of which is fixedly secured at 63 to a stationary member, for example to the housing of the control device. The magnetic coupling effected by the rotor 55 and the permanent magnet 56 impresses a torque on the shaft 51, this torque tending to rotate the shaft 57 until the spring 62 which opposes the said torque is tensioned to such a degree that the force set up in the spring counterbalances the torque, the result being that the shaft 57 comes to a standstill. Thus, any change in engine speed will produce a rotation of the shaft 57 through an angle which corresponds to and is a function of the change in engine speed.

In addition to the pinion 60, the shaft 57 carries a worm 58 which is in engagement with the worm wheel 59 mounted on the governor shaft 1. The member 3 serving to adjust the delivery of the fuel injection pump cooperates with the periphery of a cam 2 the shape of which has been derived from a certain predetermined law.

The axial position of the control cam 2 is determined by the position of a member adapted to slide the control cam 2 along the governor shaft; in the instant embodiment, the said member is in the form of a bell crank lever the free arm 4 of which engages in an annular groove 6 provided in the control cam 2, the other arm 5 of the bell crank lever is connected by means of a rod 5' to the accelerator lever 5''. In the present embodiment, the intake air throttle member 9 is in the form of a rotary valve. The valve adjusting lever 10 of the rotary valve 9 cooperates with one arm 11 of another bell crank lever the other arm 12 of which cooperates with two plungers 13 and 14 which are mounted for axial sliding movement in directions perpendicular to the axis of the governor shaft 1. The arm 11 of the bell crank lever 11, 12 is engaged by a spring 15 which is adapted to move the air throttle valve 9 into its closed position shown in Fig. 1, or to urge the plunger 13 against a third arm 16 provided on the bell crank lever 4, 5 or to urge the plunger 14 against the periphery of a disc cam 17 mounted on the governor shaft 1.

Figure 3:
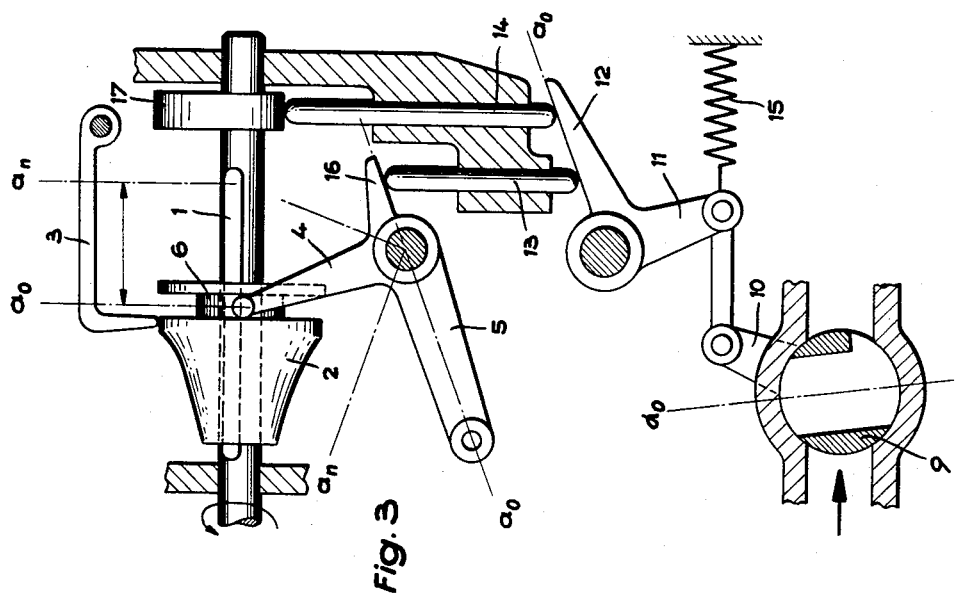
Fig. 3 illustrates the control device of the invention with the accelerator lever in its idling position, the engine operating at a higher speed, the air throttle having been rotated beyond its fully closed position.
Figure 7:
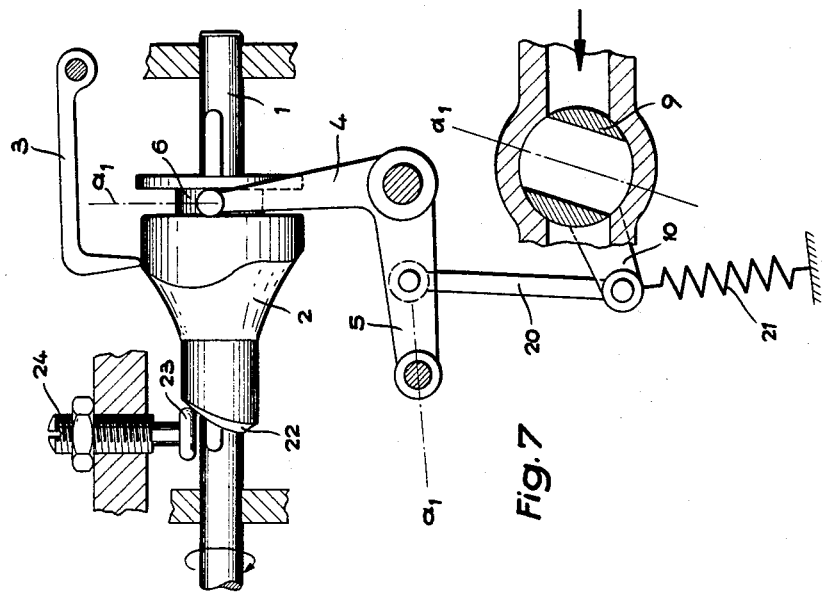
Figure 6:
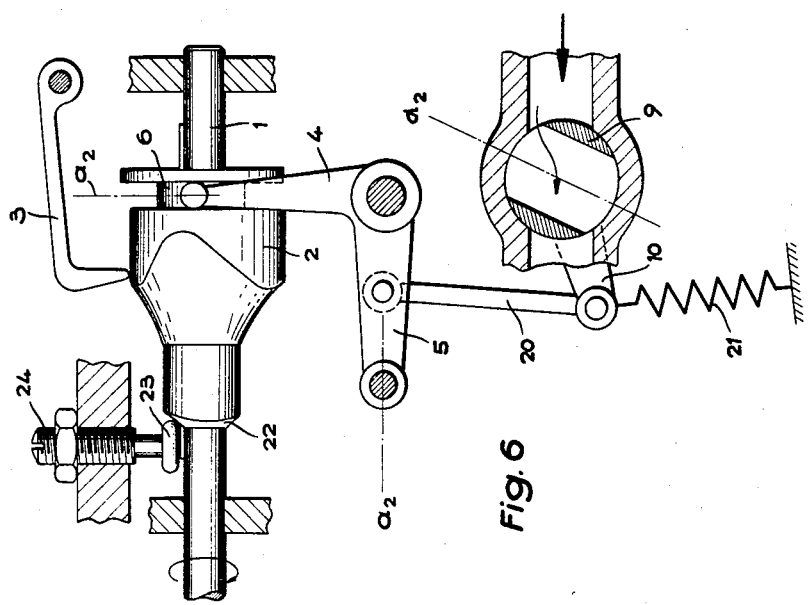
Figure 9:
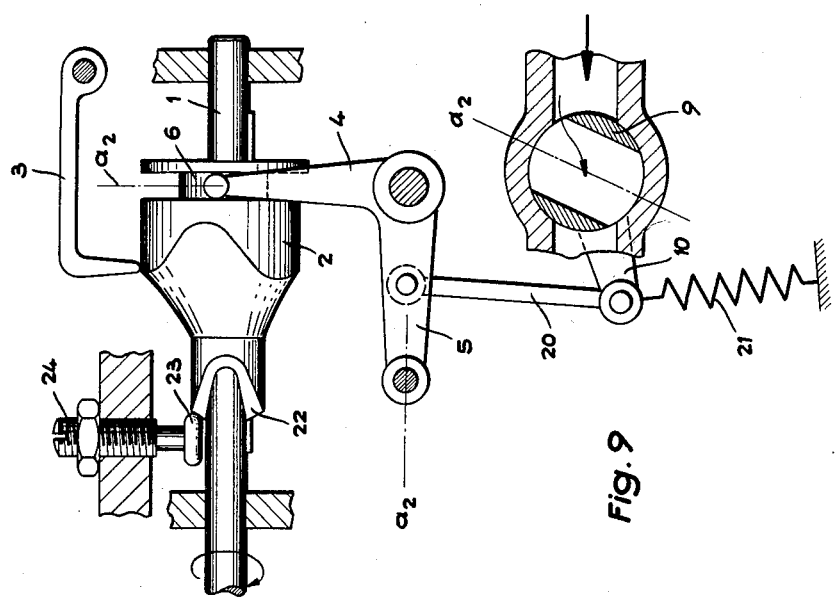
Figure 8:
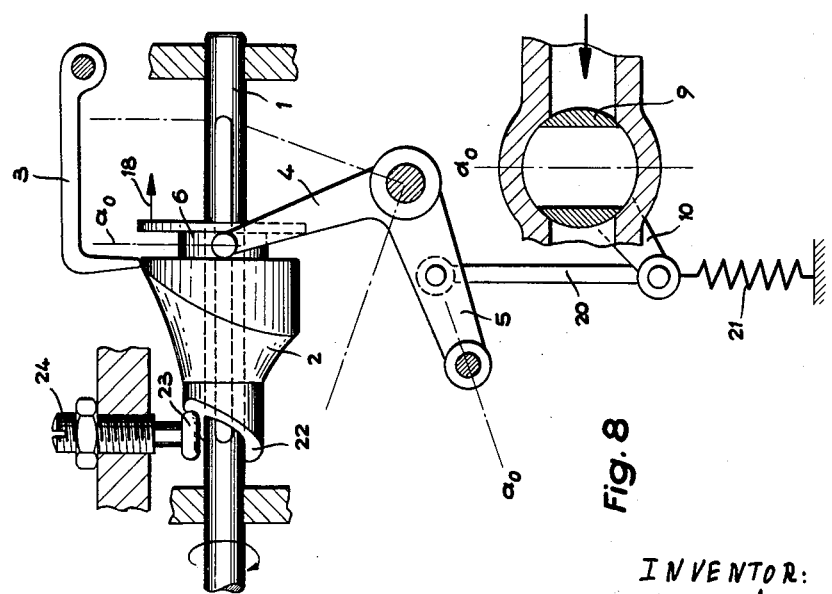

In the idling position $a_0$ of the bell crank lever 4, 5 serving to adjust the air throttle 9 (see Fig. 1), and the control cam 2, the arm 16 has been lifted off the plunger 13, and the disc cam 17 is in driving engagement with the air throttle 9 by way of plunger 14 and bell crank lever 11, 12. The disc cam 17 is shaped in such a manner that, upon engine speed exceeding a speed $n_2$ which is higher than the speed necessary to maintain smooth idling operation (i.e. higher than a speed $n_1$), it will keep the throttle member 9 in the position $\alpha_1$ as seen in Fig. 2, in which position the throttle member completely or substantially completely closes the air intake passage, and that the disc cam progressively opens the throttle member upon the engine speed being reduced to zero, i.e. up to a complete stop (speed $n_0$) (see curve $F_0$ in Fig. 5). With the engine running at a speed $n_1$, i.e. the speed required to maintain the idling operation, the throttle member 9 assumes the open position $\alpha_2$ shown in Fig. 1, in which position it will admit the minimum air flow required for idling. With the device of the invention in the idling position $a_0$ (Fig. 3), the periphery of the control cam 2, when subject to rotation as a function of engine speed, will influence the injection pump member 3 in such a manner that, upon the speed of the engine being increased, due to a driving effect imposed thereon by the road wheels, beyond the speed $n_1$ required for idling and up to a speed $n_3$ which is higher than the speed $n_2$ beyond which latter the throttle member 9 will be closed, the rate of delivery of the fuel injection pump is reduced to zero as indicated by curve $a_0$ in Fig. 5. At the same time, as shown in Fig. 3, the disc cam 17, through the medium of plunger 14, bell crank lever 11, 12 and lever arm 10, will further rotate the throttle member 9 in the closing sense beyond the initial closing position $\alpha_1$ (Fig. 2) until the position $\alpha_0$ of Fig. 3 is reached. Fig. 4 shows the position of the various members of the control device of the invention under conditions in which the engine is being driven by the road wheels, the engine then attaining a speed $n_4$ which is higher than the speed $n_3$ at which latter speed the throttle member had been rotated beyond its initial closing position $\alpha_1$ into position $\alpha_0$. In this case in which the admission passage has again been opened in order to provide the engine with the air flow required to produce a braking effect by the action of compressing air in the cylinders, the fuel injection pump control member 3 will remain in its zero delivery position. However, the disc cam 17, the angular position of which is a function of engine speed, has been rotated beyond the angular position shown in Fig. 3 and, in the meantime, has returned the throttle member 9 to the position $\alpha_2$ corresponding to the idling position, this action being effected by way of plunger 14, bell crank lever 11, 12 and lever arm 10. Thus it will be seen that the engine can draw in air at a higher rate as is necessary to permit a braking action to be produced by the engine compressing the air drawn in, this being possible without an ignitable mixture being formed in the combustion chambers. With a cam disc 17 of suitable shape and with the plungers 13 and 14 being designed in a suitable manner, it is possible, upon the engine speed being increased due to the fact that the crankshaft is driven by the road wheels, to provide for the throttle member 9 to be opened again by rotation in the same sense as the rotation occurring in the described manner during the adjustment of the throttle from its idling position $\alpha_2$ to its closed position $\alpha_0$.

If it is intended, while the engine is being driven by the road wheels, to resume operation on fuel injection at a speed $n_3$ or at a higher speed, for example the speed $n_4$, it will be necessary, according to Fig. 3, to move the accelerator lever 5 from its idling position $a_0$ towards its full-throttle position $a_n$. This will cause lever arm 16 acting through plunger 13, bell crank lever 11, 12 and lever arm 10 to move the throttle member 9 into its open position. At the same time the injection pump control member 3 will be acted upon by the periphery of the control cam 2 moving axially of the governor shaft 1 in the direction of arrow 18 in such a manner that the injection pump starts delivering fuel, the rate of fuel delivery being increased progressively. It will be understood that fuel injection is started while the throttle member 9 is still closed. Since the speed $n_3$ beyond which, in the idling position $a_0$, the delivery of fuel by the injection pump is interrupted, exceeds the speed $n_2$ beyond which, also in the idling position, the throttle member 9 is closed, the progressive opening of the throttle member is delayed in relation to the progressive increase in the rate of fuel injection. It will be appreciated that it is possible, without difficulty, to provide, within the entire transition range discussed earlier, for a fuel/air mixture in which the proportion of fuel is greater than stoichiometrically necessary, the result being that the presence of an ignitable mixture is ensured at all times. In the embodiment shown in Figs 6 to 9 inclusive, there is again provided a governor shaft 1 the angular position of which is a function of engine speed, the governor shaft carrying an axially movable control cam 2. Again the periphery of the control cam 2 co-operates with an injection pump control member 3, and the axial position of the control cam 2 is a function of a bell crank lever 4, 5 the arm 4 of which engages in an annular groove 6 provided in the control cam, the other arm 5 of the bell crank lever constituting or being connected to the accelerator lever. Thus, the accelerator lever 5 is positively connected with the control cam 2 which is axially displaceable along the governor shaft 2, this arrangement being per se known, but is also positively connected with the throttle member 9. The throttle member 9 is urged towards its closed position by a spring 21 one end of which is connected with the throttle control lever 10. One end face 22 of the control cam 2 is formed as a face cam which, in cooperation with a stationary stop member 23, limits the displacement of the control cam 2 to the left in Figs. 6 to 9, thus also limiting the angular movement of the accelerator or throttle control lever 5 towards its stopping position $a_0$, it being understood that the extreme left-hand position of control cam 2 is a function of the angular position of governor shaft 1, which latter's position is in turn a function of engine speed. Now the control cam face 22 is given a shape such that the positions $a_1$ and $a_0$ in which the throttle member 9 has just been closed or has been rotated in its closing direction beyond its initial closing position, respectively, can only be reached if an engine speed $n_2$ has been attained or exceeded which is higher than the minimum speed $n_1$ required for idling operation of the engine. If the engine speed is lower than $n_2$, it is impossible to rotate the accelerator lever 5 up to the position $a_0$, and the throttle member 9 will open a passage through which the engine can draw in air. With the engine running at the speed $n_1$ and with the accelerator lever in the position $a_2$, the passage uncovered by the throttle member 9 in the corresponding position $\alpha_2$ is of the proper size for operating the engine under idling conditions; by the same token, the rate of fuel injection with the accelerator lever in the aforesaid position, will meet the idling requirements of the engine. Thus, when the accelerator lever 5 is being shifted to its idling position, the size of the induction passage will be changed within the range of speeds from $n_0$ to $n_2$ as shown in the chart of Fig. 5. Furthermore, the injection pump will cease delivering fuel as soon as in the idling position the speed $n_3$ is attained or exceeded, the speed $n_3$ being slightly higher than the speed $n_2$. While the engine speed is increased from $n_2$ up to $n_3$ or even beyond $n_3$, the control cam 2 can be displaced still further to the left, thus allowing the accelerator lever 5 to be moved towards its idling position beyond the position $a_1$ and into its position $a_0$ so that the throttle member 9 will be moved past the position $a_1$ shown in Fig. 7 so as to assume the position shown in Fig. 8 while still remaining completely closed. Thus, at an engine speed exceeding the speed $n_2$, moving the accelerator lever 5 from its idling position towards its full throttle position, causing the control cam 2 to be displaced to the right in Figs. 6 to 9, fuel injection will be resumed first, and it is not until the accelerator lever 5 is moved past the position $a_1$ that the throttle member 9 will be opened. Again, therefore, the opening of the air admission passage is delayed in relation to the resumption of fuel injection.

With the engine being driven by the road wheels, while the rate of fuel delivery by the injection pump is zero, and with the speed of the engine being increased beyond $n_3$ until a higher speed $n_4$ is reached, it will again be necessary to re-open the admission passage to permit the engine to be supplied with an air flow that is sufficient to allow the engine to produce a braking action by compressing the air thus admitted. With the parts of the control device of the invention under these conditions assuming the position shown in Fig. 9, the injection pump control member 3 will be maintained in its horizontal position in which the delivery of the fuel injection pump is zero. Due to the additional increase in engine speed the control cam 2 has been rotated further. This rotation, due to the action of the stationary stop 23 on the face cam portion 22 of cam 2, has caused the control cam 2 to be axially displaced in the direction of arrow 18, the result being that bell crank lever 4, 5, acting through linkage 20 and lever arm 10, has returned the throttling member 9 into its open position $\alpha_2$ which corresponds to the idling position. Also in the case of this embodiment it is possible, if desired, to design the face cam 22 in such a manner that the throttling member 9, upon the engine reaching a speed $n_4$ due to the crankshaft being driven by the road wheels, is not returned into its open position $\alpha_2$ but is rotated in an opposite sense, i.e. in the direction in which it is rotated from the idling position $\alpha_2$ to the closed position $\alpha_0$, until the throttling member is again opened by a corresponding amount.

It is convenient to make the stationary stop member 23 adjustable so as to permit its basic adjustment to be varied. In the embodiment just described, the said stop member can be adjusted radially in relation to the axis of the governor shaft 1 by means of an adjusting screw 24, the stop member 23 cooperating with a sloping cam face 22.

It will be seen in Figs. 10 and 11 that it is possible, by designing the controlling edge 47 within the admission passage, i.e. of the hollow cylindrical portion 50 receiving the cylindrical throttling member 9, in a suitable manner, to cause the opening characteristic of the throttling member to follow any given law derived from the conditions prevailing in a given engine which is fitted with a control device according to the invention. While in the case of the throttling members respectively shown in Figs. 1 to 4 and Figs. 6 to 9 the opening of the throttling member, due to the circular cross-section of the admission passage debouching into the hollow cylindrical section, will cause the free cross-section to be increased very suddenly, the cross-sectional area being practically multiplied from one angular position to the next, it is possible, by designing the recess 48 adjacent the controlling edge 47 of the hollow cylindrical portion of the passage in accordance with the requirements of the engine, to provide for the cross-section uncovered during rotation of the throttling member to be increased in a manner that is a function of the angular position of the throttling member 9. In the embodiment of Figs. 10 and 11, the controlling edge 51 of the throttling member 9 is rectilinear in the region in which it cooperates with the recesses provided in the hollow cylindrical portion of the admission passage 49.

It is, however, possible, as shown in Figs. 12 and 13, to replace the rotary valve 9 by a butterfly valve 52, this butterfly valve, according to the invention and in contrast to conventional structures, in which a flap of elliptical shape is arranged within a cylindrical induction pipe and cooperates with the walls of the latter, being now of rectangular shape and disposed within a cylindrical bore 50 the axis of which is perpendicular to the axis of the admission pipe, the flap being a close fit in the bore and supported for rotation therein. In the lower range of air flow, this arrangement provides for a considerably less rapid increase in the cross-section of the air passage. Furthermore, it is only with the aid of a flap 52 designed in the manner just described that it is possible to have the flap be moved past its initial closing position as has been described earlier in connection with the rotary throttling valve 9. Besides that, it is only possible by using a flap or butterfly valve 52 arranged in the manner described to provide in the admission duct 49 the recesses 48 adjacent the controlling edges 47 cooperating with the flap member 52 and permitting the attainment of a favorable opening characteristic.

In the embodiment shown in Fig. 14, a bypass 26 is associated with the throttling member 9' which latter is in the form of a butterfly valve. The cross-section of the said bypass 26 is so dimensioned or may be so adjustable by means of a throttling screw 27 that it will allow just that flow of air to pass through that is necessary to operate the engine under idling conditions. The bypass is adapted to be shut off by a slide valve or piston 28 which is connected to a plunger 29 extending outwardly of the housing 25 and engaged by a spring 30 which urges the said valve towards its closed position. The closing movement of the control valve 28 is limited by an arm 31 of a bell crank lever the other arm 32 of which is engaged by the periphery of a cam 33 mounted on the governor shaft 1, which latter is identical with the governor shaft 1 of Figs. 1 to 4 and Figs. 6 to 9, the cam 33 serving the same function as the cam disc 17 of Figs. 1 to 4. The shape of the cam 33 is such that, with the accelerator lever (not shown) in its idling position and with the engine speed exceeding a speed $n_2$ which is higher than the speed $n_1$ which latter is necessary to maintain idling, the control valve 28 will shut off the bypass 26 so that the engine can no longer draw in any air. As soon as the engine speed drops below the speed $n_2$, cam 33 the angular position of which is a function of engine speed will progressively open the control valve 28. Upon that engine speed being attained which is necessary for the maintenance of idling, the control valve 28 will assume the position indicated by dot-and-dash lines in Fig. 14, in which position it opens the bypass 26 which allows the engine to draw in an air flow which is sufficient for idling operation. This position of the control valve may be determined by a stop member 34. The control cam (not shown) whose periphery cooperates with the injection pump control member is again preferably given a shape such that, with the accelerator lever in its idling position, the fuel delivery of the injection pump will be reduced to zero if the engine speed exceeds a speed $n_3$ which is slightly higher than the speed $n_2$ beyond which the bypass 26 is closed. It will thus be understood that, if the accelerator lever is moved away from its idling position at an engine speed which exceeds the speed $n_2$, fuel injection will be started although the throttling member is closed.

For the purpose of adjusting the cross-sectional area of the bypass 26 it is also possible to use the stop member 34 determining the maximum open position of the control valve 28 instead of or in addition to the throttling screw 27.

The embodiment shown in Fig. 15 resembles the embodiment of Fig. 14 in that there is associated with the butterfly valve 9'' bypass 36 which in the present case is provided in the housing 35. The cross-sectional area of the bypass 36 can be adjusted by means of a throttling screw 37 to provide for the air flow required for idling operation, and the bypass may be shut off by a control valve 38. One end of this control valve 38 is engaged by a spring 40 which tends to urge the valve towards its extreme open position which latter is limited by a stop member 44 which, if desired, may be adjustable. One end of the control valve 38 is subjected, through a passage 45 provided in the housing 35, to the air pressure prevailing upstream of the butterfly valve 9'', the air pressure acting in the sense of tending to close the control valve. Applied to the opposite end of the control valve 38 through a second passage 46 is the air pressure prevailing downstream of the butterfly valve 9''. Since the pressure differential between points upstream and downstream of the butterfly valve is a function of engine speed, the position of the control valve will also be a function of engine speed. In the idling position $a_0$, with the butterfly valve closed, this pressure differential which tends to close the control valve 38 will assume a value that is sufficient to overcome the force of the spring 40 tending to open the control valve. Thus, the higher the engine speed rises, the higher will be the said differential pressure and the greater will be the extent to which the control valve is moved towards its closed position. The spring 40 is so dimensioned that the differential pressure occurring at an engine speed $n_2$ which is higher than the speed $n_1$ required to maintain idling operation the control valve 38 will be closed completely. At an engine speed $n_1$ the control valve 38 will uncover the minimum cross-section of the bypass 36 which is required for idling and will assume the position indicated by dot-and-dash lines in Fig. 15 in which position its travel is limited by the stop member 44.

The rate at which fuel is delivered by the fuel injection pump can be controlled in the case of the embodiments described in the manner discussed, i.e. as a function of engine speed and as a function of the position of the butterfly valve or, in a per se known manner, as a function of the air pressure prevailing downstream of the butterfly valve, the arrangement being preferably such that the fuel delivery of the injection pump is again reduced to zero in the idling position upon the engine exceeding a speed $n_3$ which is slightly higher than the speed $n_2$ at which the control valve 38 will be closed. Thus, in similarity with the embodiments described earlier, the effect is obtained that moving the accelerator lever away from its idling position will cause the injection pump to start delivering fuel while the admission passage is still closed.

The shutting-off element provided in the bypass 36 may also be arranged to be influenced by a contact-making device the adjustment of which is a function of engine speed, the arrangement being such that the said element is moved towards its open position by electromagnetic means upon the engine speed dropping below the speed $n_2$ in a manner known per se and as for instance described in the British Patent No. 542,760.

It will be understood that modifications and variations may be effected without departing from the spirit and scope of the novel concepts of the present invention.

I claim:

1. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the speed of said engine for reducing the admission capacity of said air admission means while the speed of said engine increase between said first predetermined speed and said second predetermined speed.

2. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the speed of said engine for reducing the admission capacity of said air admission means while the speed of said engine increases between said first predetermined speed and said second predetermined speed, and for again increasing the admission capacity of said air admission means while the speed of said engine increases above said second predetermined speed.

3. In an idling arrangement for a fuel injection system in an internal combustion engine, in combination, accelerator means movable toward and away from an idling position; fuel supply means for supplying fuel to said engine; fuel flow control means responsive to the speed of said engine while said accelerator means is in the idling position thereof for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the speed of said engine while said accelerator means is in the idling position thereof for reducing the admission capacity of said air admission means while the speed of said engine increases between aid firt predetermined speed and said second predetermined speed, and for again increasing the admission capacity of said air admission means while the speed of said engine increases above said second predetermined speed.

4. In an idling arrangement for a fuel injection system in an internal combustion engine, in combination, accelerator means movable toward and away from an idling position; fuel supply means for supplying fuel to said engine; fuel flow control means responsive to the speed of said engine while said accelerator means is in the idling position thereof for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; air flow control means responsive to the speed of said engine while said accelerator means is in the idling position thereof for reducing the admission capacity of said air admission means while the speed of said engine increases between said first predetermined speed and said second predetermined speed; and control means cooperating with said accelerator means for permitting fuel flow to said engine by means of said fuel supply means when said accelerator means is moved away from said idling position and for thereafter increasing the admission capacity of said air admission means.

5. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the speed of said engine for reducing the admission capacity of said air admission means substantially to zero while the speed of said engine increases between said first predetermined speed and said second predetermined speed.

6. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; an air conduit for admitting air to said engine, said air conduit being adapted to admit air to said engine at said first predetermined speed and above a second predetermined speed higher than said first predetermined speed; and air flow control means responsive to the speed of said engine for reducing the effective cross section of said air conduit while the speed of said engine increases between said first predetermined speed and said second predetermined speed.

7. In an idling arrangement for a fuel injection system in an internal combustion engine, in combination, accelerator means movable toward and away from an idling position; fuel supply means for supplying fuel to said engine; fuel flow control means responsive to the speed of said engine while said accelerator means is in the idling position thereof for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; air flow control means responsive to the speed of said engine while said accelerator means is in the idling position thereof for reducing the admission capacity of said air admission means while the speed of said engine increases between said first predetermined speed and said second predetermined speed; and control means cooperating with said accelerator means for permitting fuel flow to said engine by means of said fuel supply means when said accelerator means is moved away from said idling position and for thereafter increasing the admission capacity of said air admission means so as to admit an amount of air insufficient for complete combustion of the amount of fuel permitted to flow to said engine.

8. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; cam means movable responsive to the speed of said engine; and actuating means operatively connected with said cam means for reducing the admission capacity of said air admission means while the speed of said engine increases between said first predetermined speed and said second predetermined speed.

9. In an idling arrangement for a fuel injection system in an internal combustion engine, in combination, accelerator means movable toward and away from an idling position; fuel supply means for supplying fuel to said engine; fuel flow control means responsive to the speed of said engine while said accelerator means is in the idling position thereof for substantially shutting off fuel flow to said engine by means of said fuel supply means when the speed of said engine exceeds a first predetermined speed and responsive to movement of said accelerator means when the latter is moved a predetermined distance away from said idling position; air admission means for admitting air to said engine, said air admission means being adapted to admit air to said engine at said first predetermined speed and above a second predetermined speed higher than said first predetermined speed; and air flow control means responsive to the speed of said engine while said accelerator means is in the idling position thereof for reducing the admission capacity of said air admission means while the speed of said engine increases between said first predetermined speed and said second predetermined speed, and for again increasing the admission capacity of said air admission means while the speed of said engine increases above said second predetermined speed and responsive to movement of said accelerator means when the latter is moved away from said idling position a distance greater than said predetermined distance.

10. In an idling arrangement for a fuel injection system in an internal combustion engine, in combination, accelerator means movable toward and away from an idling position; fuel supply means for supplying fuel to said engine; a shaft rotatable responsive to the speed of said engine; first cam means mounted on said shaft for joint rotation and axially slidable thereon responsive to movement of said accelerator means; first cam follower means cooperating with said first cam means while said accelerator means is in the idling position thereof for substantially shutting off fuel flow to said engine by means of said fuel supply means when the speed of said engine exceeds a first predetermined value; an air conduit for admitting air to said engine, said air conduit being adapted to admit air to said engine at said first predetermined speed and above a second predetermined speed higher than said first predetermined speed; valve means in said air conduit; second cam means fixedly mounted on said shaft; and second cam follower means cooperating with said second cam means while said accelerator means is in the idling positon thereof for reducing the opening of said valve means while the speed of said engine increases between said first predetermined speed and said second predetermined speed.

11. In an idling arrangement for a fuel injection system in an internal combustion engine, in combination, accelerator means movable toward and away from an idling position; fuel supply means for supplying fuel to said engine; a shaft rotatable responsive to the speed of said engine; first cam means mounted on said shaft for joint rotation and axially slidable thereon responsive to movement of said accelerator means; first cam follower means cooperating with said first cam means while said accelerator means is in the idling position thereof for substantially shutting off fuel flow to said engine by means of said fuel supply means when the speed of said engine exceeds a first predetermined value; an air conduit for admitting air to said engine, said air conduit being adapted to admit air to said engine at said first predetermined speed and above a second predetermined speed higher than said first predetermined speed; valve means in said air conduit; second cam means fixedly mounted on said shaft; second cam follower means cooperating with said second cam means while said accelerator means is in the idling position thereof for reducing the opening of said valve means while the speed of said engine increases between said first predetermined speed and said second predetermined speed; and resilient means urging said second cam follower means against said second cam means.

12. In an idling arrangement for a fuel injection system in an internal combustion engine, in combination, a shaft rotatable responsive to the speed of said engine; a control member mounted on said shaft for joint rotating movement and slidable thereon for axial movement relative to said shaft responsive to the angular position thereof; fuel supply means for supplying fuel to said engine; fuel flow control means responsive to one of said movements of said member for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the other one of said movements of said member for reducing the admission capacity of said air admission means while the speed of said engine increases between said first predetermined speed and said second predetermined speed.

13. In an idling arrangement for a fuel injection system in an internal combustion engine, in combination, a shaft rotatable responsive to the speed of said engine; cam means mounted on said shaft for joint rotating movement and slidable thereon for axial movement relative to said shaft responsive to the angular position thereof; fuel supply means for supplying fuel to said engine; fuel flow control means responsive to one of said movements of said cam means for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the other one of said movements of said cam means for reducing the admission capacity of said air admission means while the speed of said engine increases between said first predetermined speed and said second predetermined speed.

14. In an idling arrangement for a fuel injection system in an internal combustion engine, in combination, a shaft rotatable responsive to the speed of said engine; a control member mounted on said shaft for joint rotating movement and slidable thereon for axial movement relative to said shaft; a cam surface on said control member; a stop member on said engine adapted to cooperate with said cam surface for axially displacing said control member during rotating movement thereof; fuel supply means for supplying fuel to said engine; fuel flow control means responsive to one of said movements of said member for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the other one of said movements of said member for reducing the admission capacity of said air admission means while the speed of said engine increases between said first predetermined speed and said second predetermined speed.

15. In an idling arrangement for a fuel injection system in an internal combustion engine, in combination, a shaft rotatable responsive to the speed of said engine; a control member mounted on said shaft for joint rotating movement and slidable thereon for axial movement relative to said shaft; a cam surface on said control member; an adjustable stop member on said engine adapted to cooperate with said cam surface for axially displacing said control member during rotating movement thereof over a distance variable according to the adjustment of said stop member; fuel supply means for supplying fuel to said engine; fuel flow control means responsive to one of said movements of said member for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and air flow control means responsive to the other one of said movements of said member for reducing the admission capacity of said air admission means while the speed of said engine increases between said first predetermined speed and said second predetermined speed.

16. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and valve means responsive to the speed of said engine for reducing the admission capacity of said air admission means while the speed of said engine increases between said first predetermined speed and said second predetermined speed, said valve means including an air conduit and a valve member movable in said conduit.

17. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and valve means responsive to the speed of said engine for reducing the admission capacity of said air admission means while the speed of said engine increases between said first predetermined speed and said second predetermined speed, said valve means including an air conduit and a valve member rotatable in said circuit.

18. In an idling arrangement for a fuel injection system in an internal combustion engine, in combination, fuel supply means for supplying fuel to said engine; fuel flow control means responsive to the speed of said engine for substantially shutting off fuel flow to said engine by means of said fuel supply means when the speed of said engine exceeds a first predetermined speed; air admission means for admitting air to said engine, said air admission means being adapted to admit air to said engine at said first predetermined speed and above a second predetermined speed higher than said first predetermined speed; and valve means responsive to the speed of said engine for reducing the admission capacity of said air admission means while the speed of said engine increases between said first predetermined speed and said second predetermined speed, said valve means including an air conduit and a valve member rotatable in said conduit about an axis transverse to the axis of said conduit, said valve member being of substantially rectangular plate shape for cooperation with cylindrical wall portions of said air conduit.

References Cited in the file of this patent

UNITED STATES PATENTS 2,751,897  Schweizer et al. _____ June 26, 1956